United States Patent [19]
Frankel et al.

[11] 3,853,646
[45] Dec. 10, 1974

[54] SMOKELESS COMPOSITE PROPELLANTS CONTAINING CARBOXY - OR HYDROXY - TERMINATED POLYMERS AND A NITRO-ORGANIC OXIDIZER

[75] Inventors: Milton B. Frankel, Tarzana; David R. V. Golding, Malibu; Basil H. Minnich, Semi; Vernon E. Haury, Santa Susana, all of Calif.

[73] Assignee: Rockwell International Corporation, El Segundo, Calif.

[22] Filed: Apr. 5, 1967

[21] Appl. No.: 629,866

[52] U.S. Cl.............. 149/19.4, 149/19.5, 149/19.6, 149/19.9, 149/88
[51] Int. Cl................................. C06d 5/06
[58] Field of Search................................. 149/19, 88

[56] References Cited
UNITED STATES PATENTS

| | | |
|---|---|---|
| 3,087,844 | 4/1963 | Hudson et al.......................... 149/19 |
| 3,097,239 | 7/1963 | Tawney............................ 149/88 X |
| 3,155,552 | 11/1964 | Vriesen...................... 149/19 |
| 3,257,248 | 6/1966 | Short et al. ........................... 149/19 |
| 3,305,523 | 2/1967 | Burnside......................... 149/19 X |
| 3,306,939 | 2/1967 | Hill ...................................... 149/88 |

*Primary Examiner*—Benjamin R. Padgett
*Attorney, Agent, or Firm*—Robert M. Sperry

[57] ABSTRACT

Smokeless rocket propellant compositions comprising from 5 to 40% hydroxy and carboxy terminated polymers, from 60 to 90 percent oxidizer, either bis-trinitroethyl urea or tetrakis-trinitroethyl orthocarbonate, and from 0 to 5 percent a cross-linking agent selected from the group consisting of triols, tricarboxylic acids, triepoxides, and triisocyanates. The positions may also contain from 0 to 40 percent of a nitroplasticizer.

3 Claims, No Drawings

SMOKELESS COMPOSITE PROPELLANTS CONTAINING CARBOXY - OR HYDROXY - TERMINATED POLYMERS AND A NITRO-ORGANIC OXIDIZER

BACKGROUND OF DISCLOSURE

There exist many formulations for high energy solid rocket propellants. These formulations are suitable for many rocket applications, but they have one uniform disadvantage in tactical missile applications. All high energy solid propellants developed to data generate large amounts of smoke in burning. This is a disadvantage in tactical applications, as it reveals the launch position and flight path of the missile. Accordingly, there exists an urgent need for smokeless solid propellant rockets. It is an object of this invention to provide novel high energy smokeless propellant formulations and a method for making them.

A truly smokeless propellant must be based on a halogen-free, non-metallized system. Prior approaches to the system have used cyclotetramethylene tetranitramine (HMX) or cyclotrimethylene trinitramine (RDX) as an oxidizer, nitrocellulose or petrin acrylate as the binder, and nitroglycerin, trimethylolethane trinitrate, or butanetriol trinitrate as the plasticizer. These propellant systems have delivered specific impulses in the range of 230-248 seconds. Although these are the best candidate systems available, there are certain attendant disadvantages associated with these systems, such as combustion instability, high pressure exponent, and impact sensitivity. This is not surprising since HMX and RDX are high explosives which are very impact sensitive. Furthermore, the binders and plasticizers are all organic nitrate esters, a class of compounds which are impact sensitive and possess marginal thermal stability.

It is an object of this invention to provide smokeless propellant formulations that deliver high specific impulses.

It is a further object of this invention to provide smokeless propellant formulations that are relatively insensitive to impact.

It is a still further object of this invention to provide smokeless propellant formulations that do not contain organic nitrate esters.

SUMMARY OF THE INVENTION

The smokeless rocket propellant compositions of the instant invention comprise from 5 to 40 percent cured matrix polymers having an oxygen to carbon atom ratio of from about 0 to about 0.5 selected from the group consisting of hydroxy terminated polyesters that have been cured by isocyanates, hydroxy terminated polybutadienes that have been cured by isocyanates, and hydroxy terminated polyethers that have been cured by isocyanates; carboxy terminated polesters that have been cured by epoxides and carboxy terminated polybutadienes that have been cured by epoxides; from 0 to 5 percent of a compound selected from the group consisting of triols, tricarboxylic acids, triepoxides and triisocyanates, and from 60 to 90 percent of an oxidizer selected from the group consisting of bis-trinitroethyl urea (BTNEU), tetrakis-trinitroethyl orthocarbonate (TNEOC), and combinations thereof. The compositions can additionally comprise from 0 to 40 percent of a nitroplasticizer selected from the group consisting of bisdinitropropyl acetal, bis-dinitropropyl formal, trinitrobutyronitrile, similar nitro substituted esters, ethers and nitriles, and mixtures thereof.

The cured matrix polymers of the instant invention comprise from 5 to 40 percent by weight of the propellant composition. Since the polymers described are nonenergetic, increased specific impulse will result if the polymer content is minimized. However, the mechanical properties of the grain are improved as the percentage of polymer increases. The best balance between these two considerations has been found to occur at a polymer content of about 20 percent by weight.

The binder polymer of the instant invention should have an oxygen to carbon atom ratio of from about 0 to about 0.5. If ratios in excess of 0.5 are used, the binder, which also acts as a fuel, will not have enough fuel potential to utilize the oxidation potential of the oxidizer. However, if the binder has a ratio in the 0 to 0.1 range incomplete combustion may result unless binder content is less than about 15 percent. Incomplete combustion causes unburned carbon to be expelled from the burning grain, producing smoke. This smoke is, of course, undesirable.

The binders suitable for use in the instant invention comprise dihydroxy and dicarboxy terminated polyesters and polybutadienes and dihydroxy terminated polyethers.

Examples of hydroxy terminated polyesters are prepolymers prepared from diethylene glycol and adipic acid, or from ethylene glycol and azelaic acid.

Examples of hydroxy terminated polyethers are polytetramethylene oxide glycol, polypropylene oxide glycol, poly 1,2 butene oxide glycol, etc.

Examples of hydroxy terminated polybutadienes are butadiene polymers with functional groups containing primary or secondary hydroxyl groups such as the commercial products Butarez ZHT, a trademark of Phillips Petroleum Co., and Sinclair R-45M, a trademark of Sinclair Petrochemicals, Inc. Di- and polyisocyanates have been found suitable for curing these polymers for the compositions of the instant invention.

Example of suitable diisocyanate curing agents are toluene diisocyanate (TDI), hexamethylene diisocyanate (HMDI), and bis-isocyanatophenyl methane. The curing of hydroxy terminated polymers by the diisocyanates is done by means known in the art.

Examples of suitable dicarboxy terminated polyesters are prepolymers made from adipic or azelaic acid and ethylene glycol, diethylene glycol, or tetramethylene glycol.

Examples of suitable dicarboxy polybutadienes are the commercial products Butarez CTL, a trademark of Phillips Petroleum Co., Telagen CT, a trademark of General Tire & Rubber Corp. HC434, a trademark of Thiokol Chemical Co.

These polymers have been cured in the prior art by aziridines and epoxides. However, only epoxides have been found suitable for the compositions of the instant invention, since the aziridines are not compatible with the oxidizers. Suitable epoxide curing agents include Epon 812, a trademark of Shell Chemical Corp., Unox 201, a trademark of Union Carbide Corp., and ERLA-0510, a trademark of Union Carbide Corp., DER-322, a trademark of Dow Chemical Corp.

To produce a satisfactory polymer from a standpoint of mechanical properties, the polymer used as matrix binders must be cross-linked. For instance if dihydroxy terminated polyesters are cured by diisocyanates, the resulting polymers are not substantially cross-linked and do not possess suitable mechanical properties in a solid rocket grain. This difficulty may be alleviated by the addition of suitable cross-linking agents. In the case of dihydroxy terminated polyemrs, the practitioner has three choices. He may either include triols such as trimethlol propane, hexanetriol, trifunctional prepolymers such as are in the uncured prepolymer or he may cure the prepolymer with triisocyanates, or he may do both. It can be seen that the three active sites of triols- and triisocyanates will result in cross-linking of the cured polymers. In the case of dicarboxy terminated polymers, cross-linkage may be achieved by a similar choice of curing agent or cross-linking agent. That is, the dicarboxy prepolymer can be cured by tri-epoxides, or a tricarboxy compound can be added to the prepolymer or both. The amount of cross-linking agents should be kept between 0 and 10 percent. If too much cross-linking agent is added, the resulting composition will be too rigid for use in propellant grains. The preferred range of cross-linking agent is from 0 to 5 percent. It can be seen that the lower limit of 0 is recited because a triisocyanate can be used as the curing agent for hydroxy terminated polymers, in which case no crosslinking agent is required. Of course, if a diisocyanate is used as a curing agent, then either a triol or a triisocyanate must be added as a cross-linking agent.

The oxidizers of the instant invention are selected from the group consisting of bis-trinitroethyl urea (BTNEU) and tetrakis-trinitroethyl orthocarbonate (TNEOC) and combinations thereof. The properties and preparation of BTNEU are described in U.S. Pat. No. 2,731,460 issued Jan. 17, 1956.

Optimum preparations of trinitroethyl orthocarbonate, TNEOC, consist simply of refluxing for 16–24 hours a 1.5 molal solution of dry trinitriethanol in carbon tetrachloride in the presence of a catalytic amount of anhydrous ferric chloride. Hydrogen chloride, and phosgene, as by-products, are evolved steadily during the reaction period. The product begins to form within 1-2 hours, and precipitates nearly quantitatively from the reaction mixture. After isolation of the crude material and recrystallization from chloroform, yields of 75–80 percent of trinitroethyl orthocarbonate, mp 163°C (dec) are obtained. The physical properties of trinitroethyl orthocarbonate are given below.

PROPERTIES OF TNEOC

| | |
|---|---|
| Formula | $C[OCH_2C(NO_2)_3]_4$, $C_9H_8N_{12}O_{28}$ |
| Molecular Weight | 732 |
| Melting Point | 163°C dec |
| Crystal Density | 1.84 |
| Oxygen Content | 61.18 percent |
| Solubility | Insol. in water |
| | Very slightly soluble in carbon tetrachloride, hexane, soluble in methanol, chloroform, ether |

The binders described above are known as nonenergetic binders. That is, they do not possess appreciable oxidizing capability. It has been found that an improvement in specific impulse results if some of the binder is an energetic binder. Energetic binders are generally described as prepolymers which contain substituent groups normally considered to be oxidizers in explosive and pyrotechnic technology.

Examples are polycyanodinitrobutene oxide glycol, and polyfluorodinitroethoxy propene oxide glycol. The energetic binder can comprise up to 100 percent of the binder component of the propellant compositions. It is preferred that the energetic binder comprise from 50 to 75 percent of the binder component.

The compositions can additionally comprise from 0 to 40 percent of a nitroplasticizer selected from the group consisting of bisdinitropropyl acetal, bisdinitropropyl formal, trinitrobutyronitrile and mixtures thereof. As is known in the prior art, a nitroplasticizer, will improve the specific impulse.

The composition can additionally comprise other solid rocket propellant components known in the art such as burning rate or combustion modifiers, coolants such as oxamide, and small amounts of additives to suppress combustion instability. Care should be taken that these other components do not substantially impair the desirable smokeless characteristic of the propellant. To more specifically illustrate the compositions of the instant invention, the following examples are given.

EXAMPLE I

Bis-trinitroethyl urea, a hydroxy terminated polyester binder (Mobay R-18, a trademark of Mobay Chemical Co.,) cured with HMDI, plasticized with bis-dinitropropyl acetal and bis-dinitropropyl formal and a burning rate catalyst were compounded to yield a propellant containing 79.2 percent of the solid oxidizer, 19.8 percent of the binder and 1.0 percent catalyst. The exhaust from this propellant when fired in half pound motors was smokeless. Impact sensitivity with a drop-weight tester was 22 inches with a 5 lb. weight. A conventional ammonium perchlorate composite propellant has a sensitivity of 6–8 inches with the same weight. The calculated specific impulse is 247 sec.

EXAMPLE II

A smokeless propellant was prepared by first blending 200 parts by weight of a polyether diol, 4 parts of trimethylolpropane and 0.03 parts of ferric acetylacetonate. Next, 948.12 parts of tetrakis-trinitroethyl orthocarbonate was added and mixing was continued for 30 minutes. The propellant formulation was completed by the addition of 33 parts of hexa methylene diisocyanate and mixing for 15 minutes. This formulation was cured for 24 hours at 50°C to yield a flexible propellant with good physical properties that did not produce smoke upon burning. The calculated specific impulse is 244.

EXAMPLE III

A propellant was prepared as in Example II except that the binder was modified by including 3 phr of a saturated hydrocarbon plasticizer. The polymerization catalyst was dibutyl tin dilaurate. The propellant produced did not produce smoke during burning. The ballistic properties of the formulation were similar to those of the composition of Example II.

EXAMPLE IV

A propellant was prepared as in Example III except that in this case the plasticizer was isodecyl pelargonate and the polymerization catalyst was vanadium acetyl acetonate. Upon burning, the propellant did not produce smoke. Ballistic properties similar to those of Example II are noted.

EXAMPLE V

A propellant consisting of 82 percent trinitroethyl orthocarbonate and 18 percent of a hydrocarbon binder (hydroxy terminated polybutadiene plus HMDI) was burned in a pressure vessel in a nitrogen atmosphere at 225 psig. The solid residue was only 0.6 percent, and no smoke was produced during the firing. The calculated specific impulse is 249 sec.

Since it is obvious that many changes and modifications can be made in the above-described details without departing from the nature and spirit of the invention, it is to be understood that the invention is not to be limited thereto except as set forth in the appended claims.

We claim:

1. Smokeless rocket propellant compositions comprising:

from 5 to 40 percent cured matrix polymers having an oxygen to carbon atom ratio from from about 0 to 0.5 selected from the group consisting of:

hydroxy terminated polyesters that have been cured by isocyanates;

hydroxy terminated polybutadienes that have been cured by isocyanates;

hydroxy terminated polyethers that have been cured by isocyanates;

carboxy terminated polyesters that have been cured by epoxides; and carboxy terminated polybutadienes that have been cured by epoxides;

from 0.3 to 5 percent of a compound selected from the group consisting of triols, tricarboxylic acids, triepoxides and triisocyanates; and from 60 to 90 percent of an oxidizer selected from the group consisting of bis-trinitroethyl urea, tetrakis-trinitroethyl orthocarbonate, and combinations thereof.

2. The compositions of claim 1 additionally comprising from 0 to 40 percent of a nitroplasticizer selected from the group consisting of bisdinitropropyl acetal, bis-dinitropropyl formal, trinitrobutyronitrile, similar nitro substituted esters, ethers and nitriles, and mixtures thereof.

3. The compositions of claim 2 wherein the cured matrix polymer is polyurethane cured by polyisocyanate.

* * * * *